(12) United States Patent
Martinella et al.

(10) Patent No.: US 8,832,989 B2
(45) Date of Patent: Sep. 16, 2014

(54) TIP UP FISHING APPARATUS

(76) Inventors: Chad Elliot Martinella, Edson (CA); Lawrence John Martinella, Dorintosh (CA)

( * ) Notice: Subject to any disclaimer, the term of this patent is extended or adjusted under 35 U.S.C. 154(b) by 246 days.

(21) Appl. No.: 13/106,466

(22) Filed: May 12, 2011

(65) Prior Publication Data

US 2011/0277369 A1    Nov. 17, 2011

Related U.S. Application Data

(60) Provisional application No. 61/334,913, filed on May 14, 2010.

(51) Int. Cl.
*A01K 97/12* (2006.01)
*A01K 97/01* (2006.01)

(52) U.S. Cl.
CPC .................................... *A01K 97/01* (2013.01)
USPC ........................................ 43/15; 43/16; 43/4.5

(58) Field of Classification Search
USPC ................................................... 43/15, 16, 17
See application file for complete search history.

(56) References Cited

U.S. PATENT DOCUMENTS

| | | | |
|---|---|---|---|
| 3,727,342 A * | 4/1973 | Lindsey, Jr. ......................... | 43/17 |
| 3,729,849 A | 5/1973 | Richard | |
| 4,120,111 A | 10/1978 | Young, Jr. | |
| 4,373,287 A * | 2/1983 | Grahl ................................ | 43/17 |
| 4,567,686 A | 2/1986 | Akom | |
| 4,616,437 A | 10/1986 | Harvey | |
| 4,621,446 A | 11/1986 | Anderson | |
| 4,707,932 A | 11/1987 | Sonnemaker | |
| 4,750,286 A * | 6/1988 | Gray ................................. | 43/15 |
| 4,829,697 A | 5/1989 | Nakata | |
| 4,837,965 A * | 6/1989 | True ................................. | 43/17 |
| 4,918,853 A | 4/1990 | Bascom et al. | |
| 5,231,784 A | 8/1993 | Condusta | |
| 5,551,183 A * | 9/1996 | Solem ............................... | 43/17 |
| 5,988,549 A * | 11/1999 | Hitomi et al. .................. | 242/311 |
| 6,079,142 A | 6/2000 | Danser et al. | |
| 6,421,948 B1 | 7/2002 | Craig | |
| 6,438,889 B1 * | 8/2002 | Handy ........................... | 43/21.2 |
| 6,463,691 B1 * | 10/2002 | Atkins ............................ | 43/17 |
| 6,622,421 B1 | 9/2003 | Daniels | |
| 7,162,828 B1 * | 1/2007 | Marina ............................ | 43/15 |
| 7,213,361 B1 | 5/2007 | Perigo, Sr. | |
| 7,331,139 B2 * | 2/2008 | Moses ........................... | 43/21.2 |
| 7,395,628 B2 | 7/2008 | Rayfield | |
| 2004/0237374 A1 | 12/2004 | Klein | |
| 2008/0052981 A1 * | 3/2008 | Richardson ...................... | 43/17 |

* cited by examiner

*Primary Examiner* — Kimberly Berona
*Assistant Examiner* — Marc Burgess
(74) *Attorney, Agent, or Firm* — Austin Rapp & Hardman

(57) ABSTRACT

A fishing apparatus is provided for ice fishing that can be used unattended. The apparatus can include a substantially vertical tower member, a crane member rotatably attached to the tower member and a fishing line spool rotatably attached to the tower member. Fishing line from the spool can be fed through a guide disposed on one end of the crane member to receive a hook. The crane member and spool can be held in place with threaded studs and wing nuts to keep the crane member and spool from rotating freely. The apparatus can also include means for visually indicating when a fish is hooked. These means can include fluorescent markings on one or both ends of the crane member or a self-powered light mechanism that lights a light bulb when the crane member is tipped downwards thereby indicating that a fish has been caught.

3 Claims, 11 Drawing Sheets

TIP UP FISHING APPARATUS

CROSS-REFERENCE TO RELATED APPLICATIONS

This application claims priority of U.S. provisional patent application Ser. No. 61/334,913 filed May 14, 2010, and hereby incorporates the same provisional application by reference herein in its entirety.

TECHNICAL FIELD

The present disclosure is related to the field of unattended fishing rods, in particular, unattended fishing rods that provide visual indication when a fish is caught.

BACKGROUND

Devices that hold fishing rods, or fishing rod devices that can be left unattended are known, and are typically used in ice fishing although such devices can be used in fishing in lakes or rivers from a shore or from in a boat.

Unattended fishing rod devices, especially those in ice fishing, typically have reels turn around a vertical axis and hang from the device, which usually hang from the device and sit in the water as the device is supported by the ice surrounding the fishing hole. The problems with this configuration are: a) the fishing line does not play out smoothly from the reel; b) the reel itself can freeze up and stop turning; and c) the reel cannot be manipulated to reel in the fishing line without lifting the device up, which is when the reel can freeze up.

These devices can also include a flag or "tip-up mechanism" that extends or pops up when a fish is caught on the line. These mechanisms may not always work properly, or at all.

It is, therefore, desirable to provide a fishing apparatus that overcomes the shortcomings of the known prior art fishing devices.

SUMMARY

A fishing apparatus is provided. In one embodiment, the apparatus can comprise a substantially vertical tower member that can be inserted into and supported by snow and ice when placed near a ice fishing hole, or into the ground near an open lake or flowing river. The apparatus can include a fishing line reel or spool rotatably attached to the tower member. The spool can rotate about the horizontal axis of a first stud extending substantially horizontal from the tower member. The apparatus can further comprise a crane member rotatably attached to the tower member above the spool, also about the horizontal axis of a second stud extending substantially horizontal from the tower member. In some embodiments, the crane member can comprise a fishing line guide disposed at one end thereof. In this embodiment, the fishing line can be fed through the guide and then have a hook attached to the line, which can then be placed in the ice fishing hole.

In some embodiments, the studs can be threaded to receive a wing nut that can be tightened to control the rate that the spool can rotate and, hence, how fast or slow fishing line can pay out from the spool. Tightening the wing nut can slow the rate the spool can turn whereas loosening the wing nut can allow the spool to turn more easily. A wing nut can also be used to tighten the crane member to the vertical so as to control how easily the crane member can rotate with respect to the tower member. Tightening this wing nut will increase the force required to pull the crane member downwards whereas loosening the wing nut will decrease the required force.

In operation, the lower end of the tower member is inserted into the snow and ice surrounding an ice fishing hole, which can be held into position by packing further snow and ice around the base of the tower member. Fishing line is fed through the guide to have a hook attached thereto. The hook and a desired length of line is lowered into the water through the hole. The wing nut on the spool is tightened to a desired tautness so that line can be withdrawn from the spool but not so loose that the spool can freewheel. The crane member can then be positioned such that the end with the guide is in an elevated position. The wing nut on the crane member can be tightened so that the crane member stays in the elevated position but still allows the guide end of the crane member to be pulled down when a fish is hooked thereby putting tension on the line and pulling the guide end of the crane member downwards. In some embodiments, the apparatus can be configured such that when the crane member is pulled down, it can contact the spool and function as a brake or drag on the spool to prevent or eliminate fishing line backlash and tangling of the fishing line when a fish is retrieved.

In some embodiments, the apparatus can comprise means for visually indicating when a fish has been caught. In one embodiment, the means can comprise fluorescent markings on one or both ends of the crane member, which can be observed when a fish is hooked on the line. In representative embodiments, the fluorescent marking is on the guide end of the crane member. When a fish is hooked, the guide end of the crane member can be pulled down. The tipping down of the guide end with fluorescent marking then causes a visual indication of a fish being hooked. In this regard, the apparatus can be referred to as a "tip down" unit. In other embodiments, the visual indication means can comprise a battery-powered light mechanism that turns on a light when the guide end of the crane member is lowered as a result of hooking a fish.

Broadly stated, in some embodiments, a fishing apparatus is provided, comprising: a substantially vertical tower member having upper and lower ends; a fishing line spool rotatably attached to the tower member nearer the lower end, the spool configured to rotate about a substantially horizontal first axis; a crane member having first and second ends, the crane member rotatably attached to the tower member nearer the upper end and nearer the first end, the crane member configured to rotate about a substantially horizontal second axis; and a fishing line guide disposed on the second end of the crane member.

Broadly stated, in some embodiments, a method is provided for ice fishing, the method comprising the steps of: drilling a hole for ice fishing through a layer of ice covering a body of water containing fish; providing a fishing apparatus, comprising: a substantially vertical tower member having upper and lower ends, a fishing line spool rotatably attached to the tower member nearer the lower end, the spool configured to rotate about a substantially horizontal first axis, the spool further comprising fishing line disposed thereon, the fishing line comprising a hook disposed on a free end thereof, a crane member having first and second ends, the crane member rotatably attached to the tower member nearer the upper end and nearer the first end, the crane member configured to rotate about a substantially horizontal second axis, and a fishing line guide disposed on the second end of the crane member; erecting the fishing apparatus beside the fishing hole; and paying out the fishing line and hook from the fishing apparatus through the fishing hole into the body of water.

DETAILED DESCRIPTION OF EMBODIMENTS

A fishing apparatus is provided. In some embodiments, the fishing apparatus can be used as an unattended fishing device for ice fishing. In other embodiments, the fishing apparatus can be used as an unattended fishing device for fishing a shore. In further embodiments, the fishing apparatus can be used as an unattended fishing device in a boat.

Figure 1:
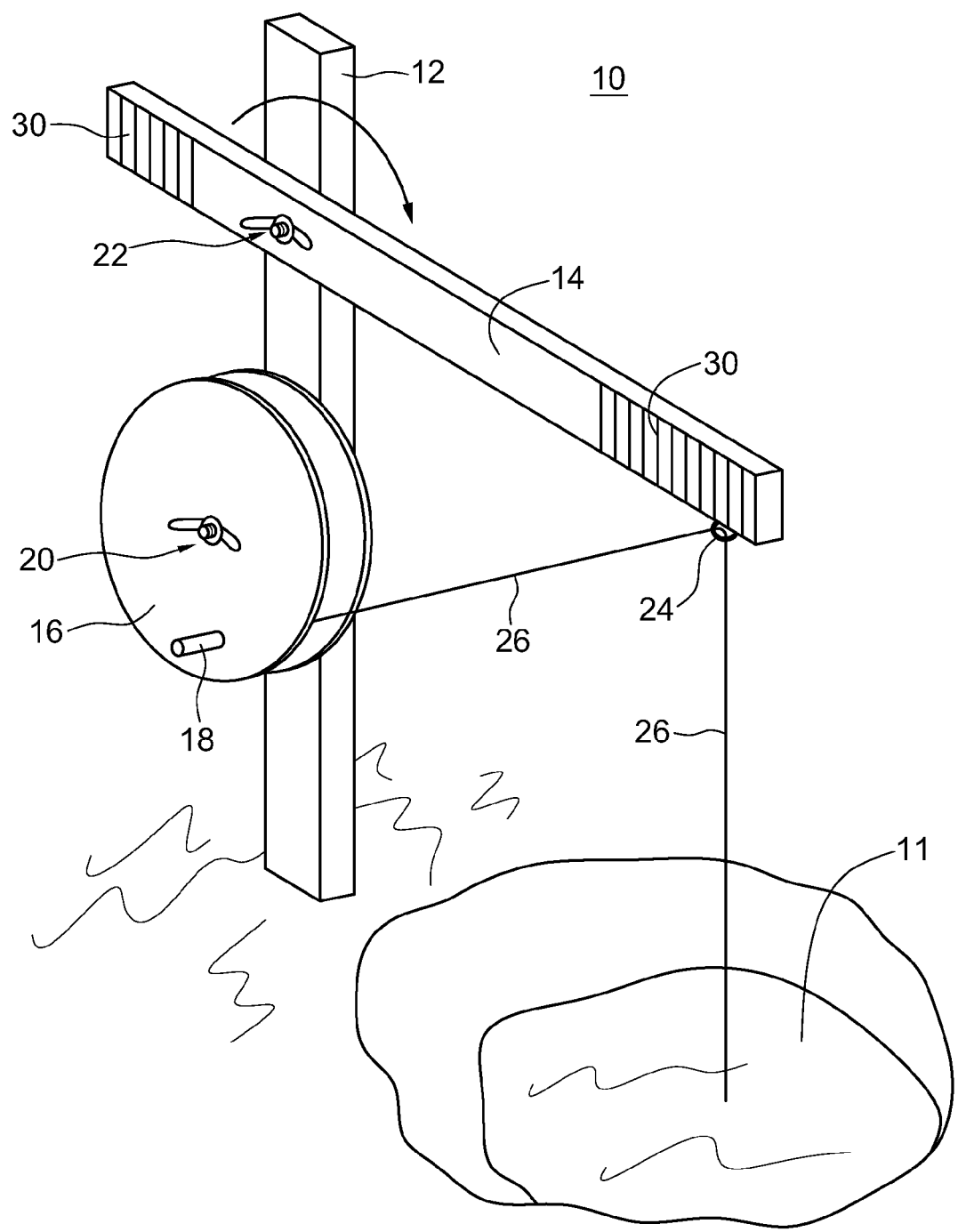
FIG. 1 is a perspective view depicting one embodiment of a fishing apparatus.

Referring to FIG. 1, one embodiment of fishing apparatus 10 is shown. In this embodiment, apparatus 10 can comprise substantially vertical tower member 12, crane member 14 rotatably attached to tower member 12 nearer an upper end thereof, and can be tightened to tower member 12 with wing nut 22. Apparatus 10 can also comprise fishing line reel or spool 16 rotatably attached to tower member 12 nearer a lower end thereof, and can be tightened to tower member 12 with wing nut 20. Spool 16 can further comprise handle 18 attached thereto to manually reel in fishing line 26. Fishing line 26 can be paid out from spool 16 through line guide 24 and have a hook (not shown) attached thereto for placing in the water through ice fishing hole 11.

In some embodiments, each of the vertical and crane members can be longer than the diameter of fishing hole 11 so as to prevent apparatus 10 from falling into or being dragged into hole 11 when a fish is hooked although the actual length of the members is not critical. In representative embodiments, the length of the vertical and crane members can be 18". In some embodiments, tower member 12 and crane member 14 can be constructed of nominal 1"×2" solid or laminated lumber although any suitable materials or dimensions for the members can be used as well known to those skilled in the art.

In other embodiments, apparatus 10 can comprise means for visually indicating when a fish is caught. In one embodiment, the visual indication means can comprise fluorescent markings 30 disposed on one or both ends of crane member 14.

Figure 2:
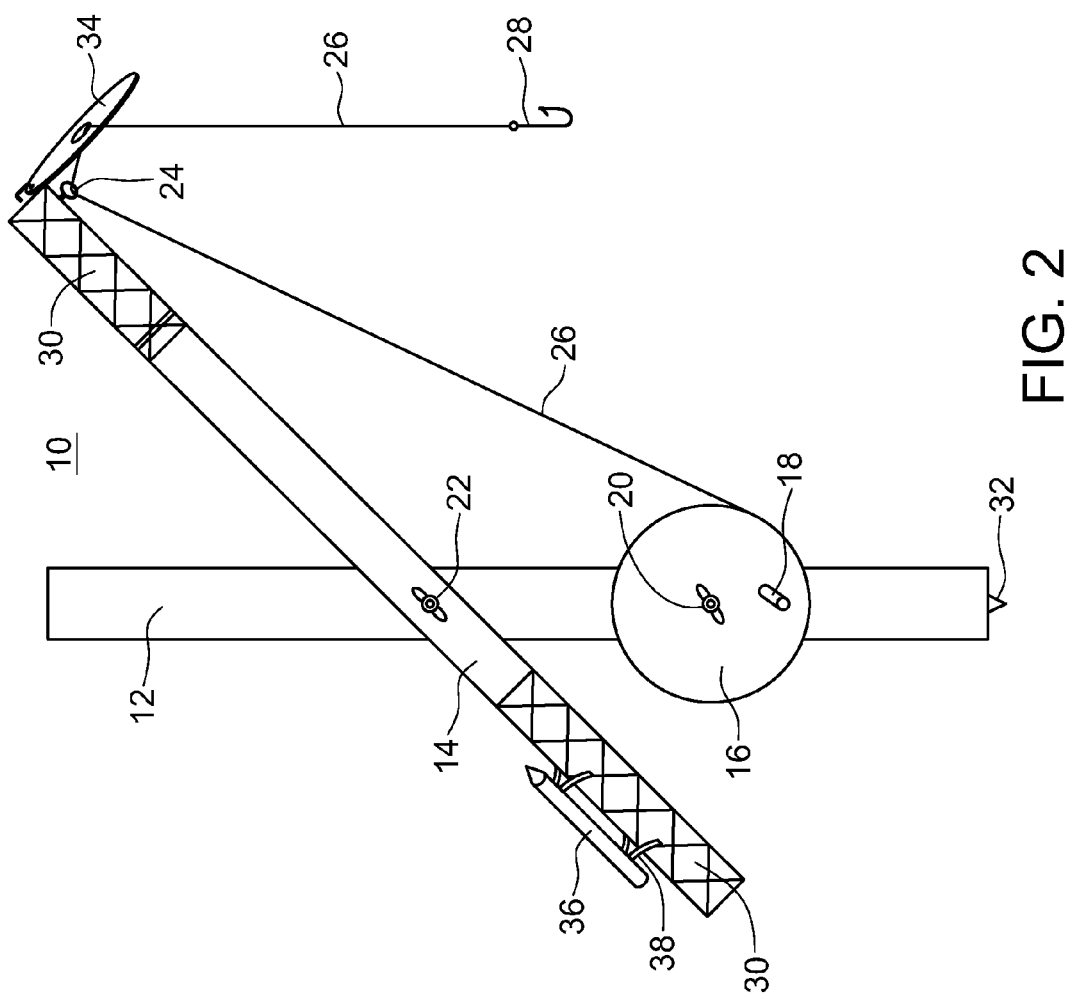
FIG. 2 is a side elevation view depicting another embodiment of a fishing apparatus.

Referring to FIG. 2, a side view of apparatus 10 is shown. In this embodiment, apparatus 10 can comprise spike 32 disposed on the lower end of tower member 12 for inserting into the ice, which can be used to further stabilize apparatus 10 when it is placed on the ice beside an ice fishing hole, or for inserting into the ground when apparatus 10 is placed on the shore of a lake or river. In this illustrated embodiment, apparatus 10 comprises strike indicator 36 attached to crane member 14 via support legs 38, which further comprises a light mechanism to provide visual indication when a fish is caught. In other embodiments, apparatus can further comprise wind jig 34 disposed at an end of crane member 14.

Figure 3:
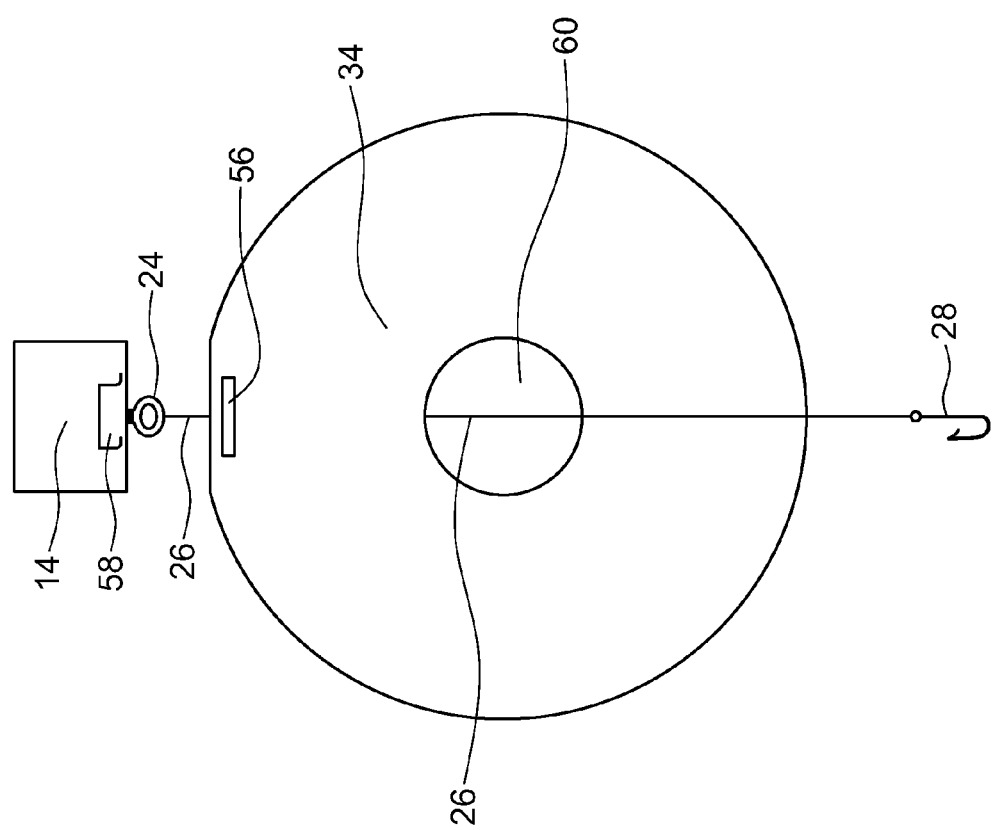
FIG. 3 is a front elevation view depicting the fishing apparatus of FIG. 2.

Referring to FIGS. 2 and 3, wind jig 34 can be comprised of a flat disk-like member that can be hingeably attached to crane member 14, and guide opening 60, as shown in FIG. 3. In some embodiments, wind jig 34 can comprise slot 56 whereby wind jig 34 can be removably hooked onto slot holder 58 disposed on an end of crane member 14. When wing jig 34 is attached to apparatus 10, fishing line 26 can be guided from line guide 24 through guide opening 60 before having a hook attached thereto and placed in the water. In so doing, any wind flowing past apparatus 10 can move wind jig 34 and, hence, jig fishing line 26 up and down. In some embodiments, the attachment of wind jig 34 to apparatus 10 can be configured such that the movement of wind jig 34 when a wind is blowing will only move fishing line 26 and not the rest of apparatus 10.

Figure 4:
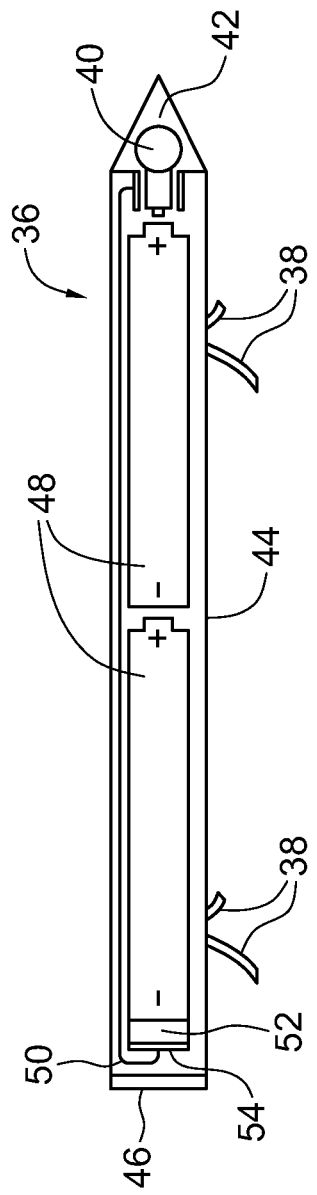
FIG. 4 is a side elevation cutaway view depicting the light mechanism for the fishing apparatus of FIG. 2.

Referring to FIG. 4, an embodiment of strike indicator 36 is shown. In this embodiment, indicator 36 can comprise body 44 that is configured to hold one or more batteries 48. Indicator 36 can comprise nose 42 disposed on a first end of body 44, which can further comprise light bulb 48. Batteries 48 can be contained in body 44 with end cap 46 threaded into a second end of body 44. Indicator 36 can further comprise rubber mount 52 and ground disk 54 for placement against a terminal of a battery 48. Wire 50 provides an electrical path between disk 54 and a first electrical contact of light bulb 40. When the guide end of crane member 14 is in a raised or elevated position, indicator 36 can be configured such that there is a gap between a second electrical contact of light bulb 48 and battery 48. When the guide end of crane member 14 is lowered, such as when a fish is hooked, body 44 also tilts downward thereby allowing batteries 48 to slide towards light bulb 44 within body 44 so that battery 48 contacts the second contact of light bulb 44 thereby closing an electrical circuit and causing light bulb 48 to illuminate. It is obvious to those skilled in the art that other embodiments can be used to activate a light mechanism in addition to one the illustrated in this embodiment which can include, but are not limited to, mercury switches, micro-switches, Hall effect magnetic switches, optoelectronic switches and devices, and any other functionally equivalent switches known to those skilled in the art.

Figure 5:
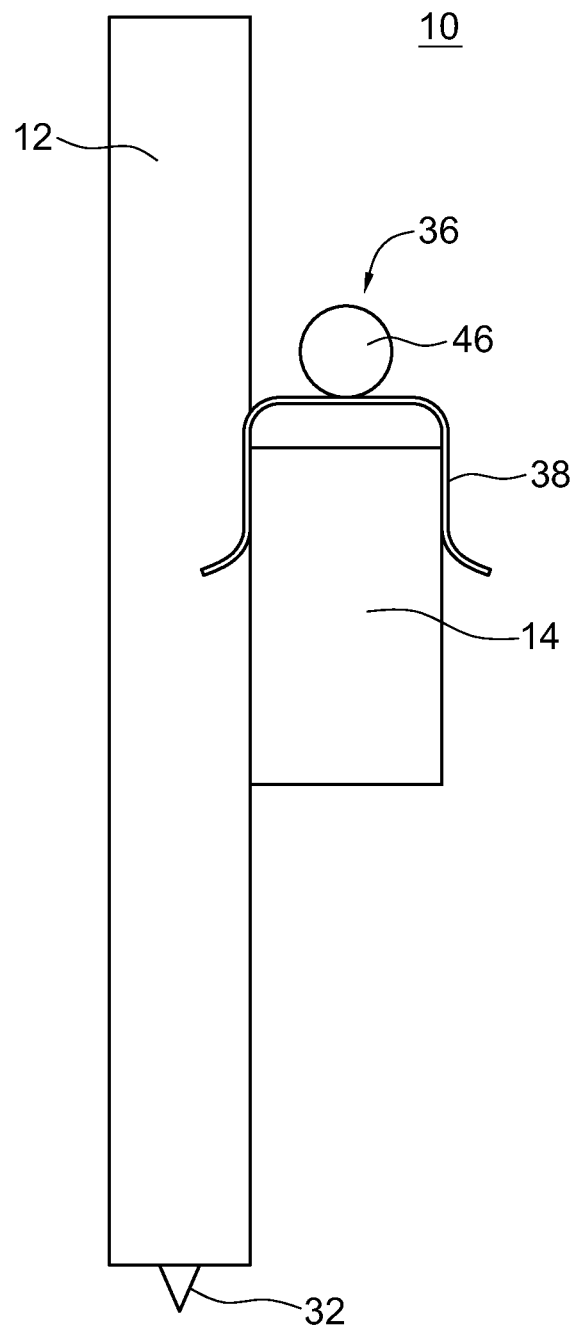
FIG. 5 is a rear elevation view depicting the fishing apparatus of FIG. 2.

Referring to FIG. 5, shown is one embodiment of indicator 36, which can be releasably attached to crane member 14 via support legs 38. Legs 38 can comprise bent steel legs that are bent such that the steel legs are biased towards each other and function like a spring clamp that can be snugly slipped on and off of crane member 14.

Figure 6:
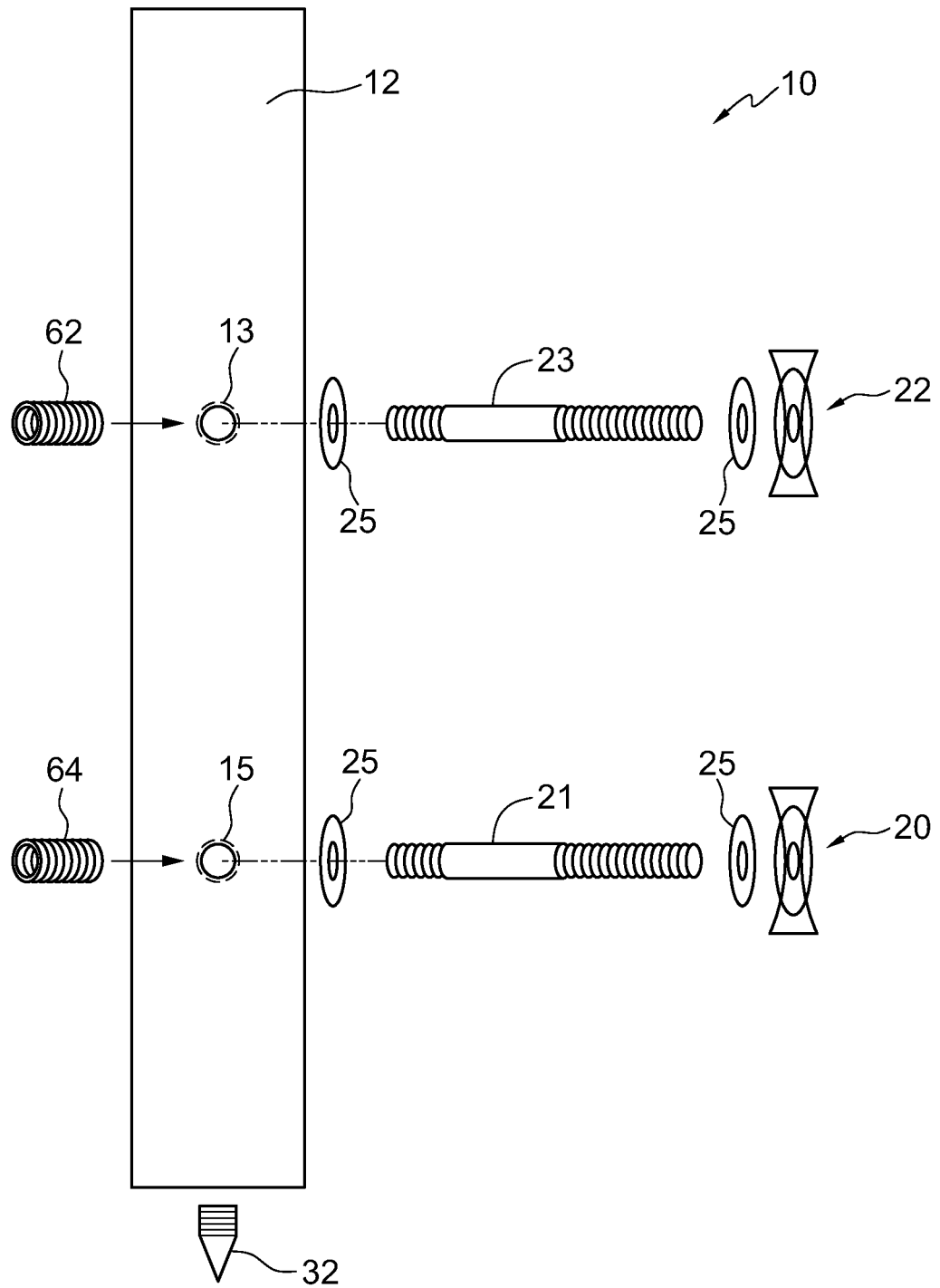
FIG. 6 is a side elevation exploded view depicting the tower member of the fishing apparatus of FIG. 2.

Referring to FIG. 6, apparatus 10 is shown. In some embodiments, apparatus 10 can comprise crane insert 62, which can comprise a sleeve with internal threads, inserted into hole 13 disposed on tower member 12. Crane stud 23 can be threaded into insert 62 and extend substantially horizontally from tower member 12 as a means for crane member 14 to be rotatably attached thereto. Apparatus 10 can further comprise washers 25 disposed on stud 23 and wing nut 22 threadably attached on stud 23.

Similarly, some embodiments of apparatus 10 can comprise reel insert 64, which can comprise a sleeve with internal threads, inserted into hole 15 disposed on tower member 12. Reel stud 21 can be threaded into insert 64 and extend substantially horizontally from tower member 12 as a means for spool 16 to be rotatably attached thereto. Apparatus 10 can further comprise washers 25 disposed on stud 21 and wing nut 20 threadably attached on stud 21.

Figure 7:
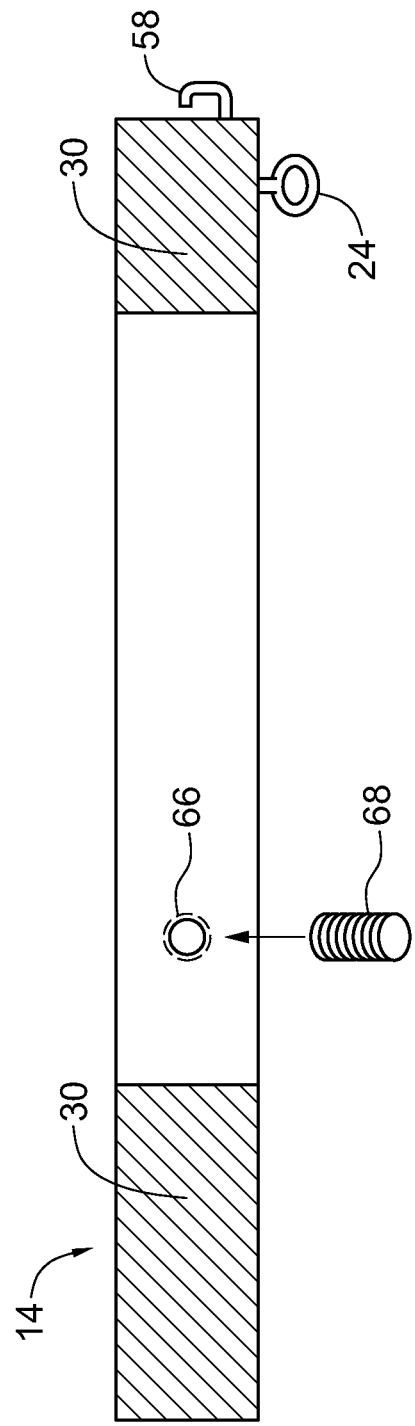
FIG. 7 is a side elevation view depicting the crane member of the fishing apparatus of FIG. 2.

Referring to FIG. 7, some embodiments of crane member 14 can comprise crane insert 68 disposed in hole 66 extending through crane member 14. Crane insert 68 can comprise of a sleeve configured to allow crane stud 23 pass through.

Figure 8:
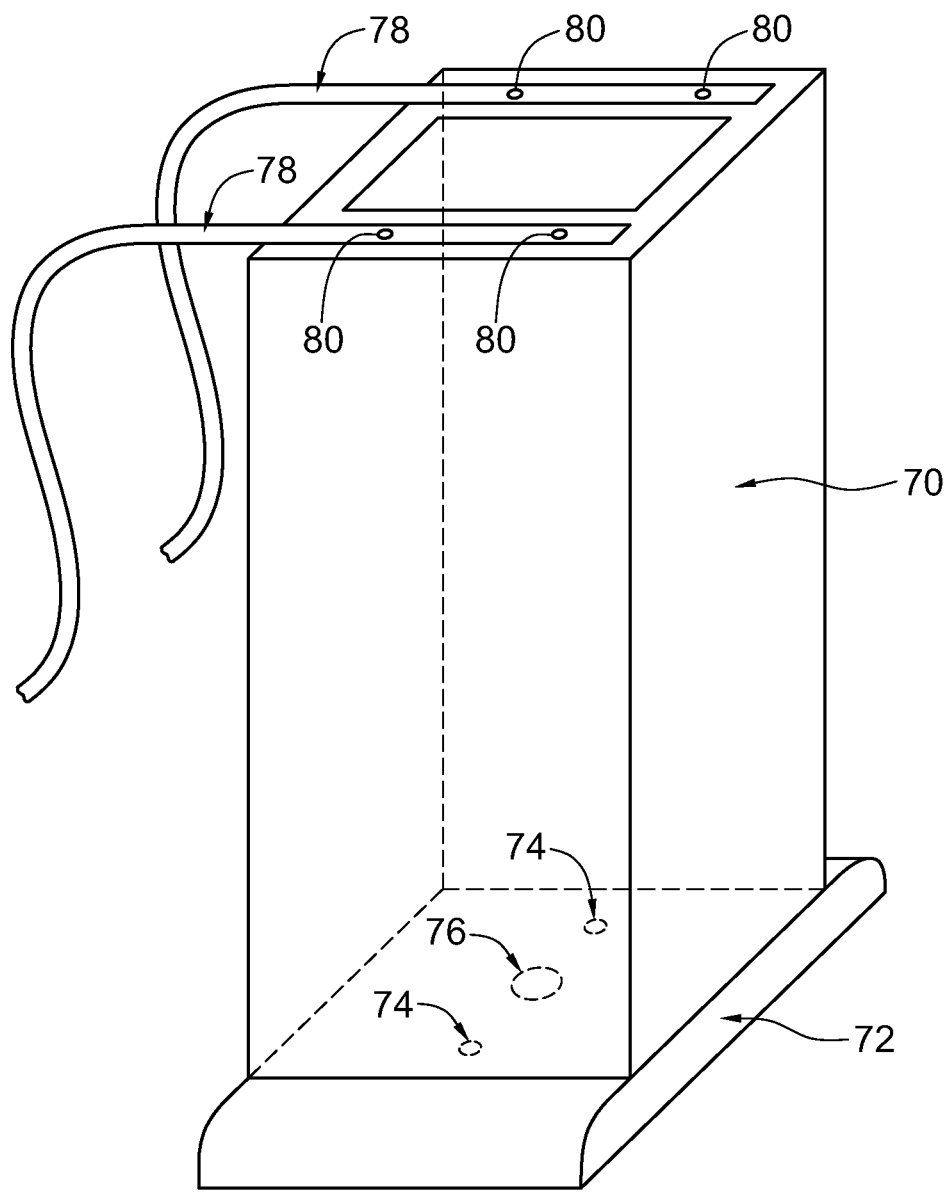
FIG. 8 is a perspective view depicting a holder bracket for the fishing apparatus of FIG. 1 or FIG. 2.

In some embodiments, apparatus 10 can further comprise a holder configured to sit on the ground and/or be releasably attached to an edge of a boat and hold apparatus 10 upright. Referring to FIG. 8, one embodiment of holder bracket 70 is shown. In some embodiments, holder bracket 70 can be comprised of an upright, box-like structure configured to receive the lower end of tower member 12 in opening or inlet 71. Holder bracket 70 can further comprise base 72, which can be attached thereto with screws 74. Holder bracket 70 can further comprise drain hole 76 to allow water that may accumulate on tower member 12 to drain from holder bracket 70. In other embodiments, holder bracket 70 can further comprise one or more holder supports 78 that are configured to releasably clip or attach holder bracket 70 to an edge of a boat (not shown). Supports 78 can be attached to holder bracket 70 with screws 80.

Figure 9:
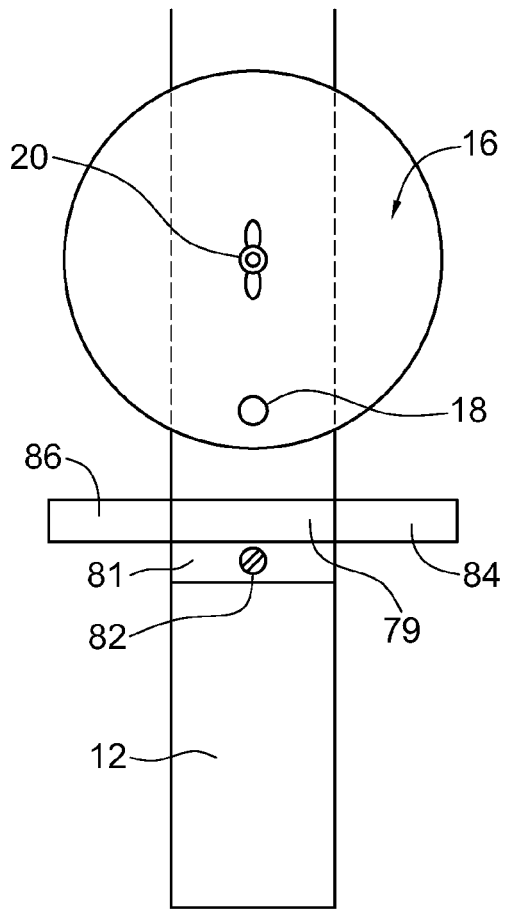
FIG. 9 is a side elevation view depicting the fishing apparatus of FIG. 1 or FIG. 2 having a spool guard disposed under the reel spool.
Figure 10:
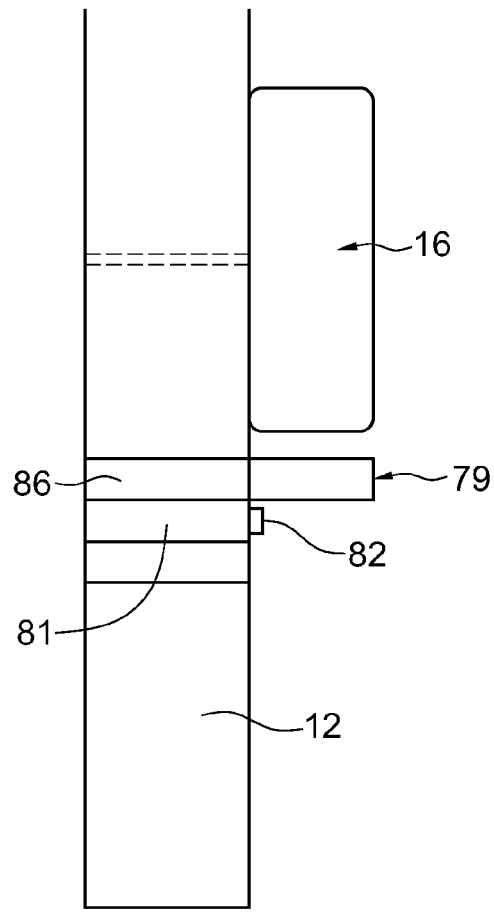
FIG. 10 is a rear elevation view depicting the fishing apparatus of FIG. 9.

In some embodiments, apparatus 10 can further comprise spool guard 79 disposed on tower 12, as shown in FIGS. 9 and 10. Spool guard 79 can further comprise skirt 81 that, in combination, can be configured to fit or slide onto tower 12 and be fastened thereto. In some embodiments, spool guard 79 can be fastened to tower 12 with screw 82 although any other functional means can be used to attach spool guard 79 to tower 12 as well known to those skilled in the art. Spool guard 79 can function as a depth indicator to prevent apparatus 10 from being inserted to far into snow or ice such that spool 16 is buried in the snow or ice. Spool guard 79 can also function to protect spool 16 from snow or ice.

Figure 11:
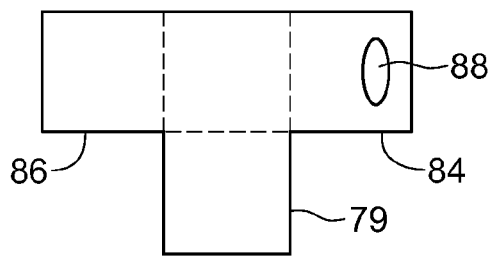
FIG. 11 is a top plan view depicting the spool guard of FIG. 9.

In some embodiments, spool guard 79 can further comprise rear tab 86 and front tab 84, as shown in FIG. 11. Front and rear tabs 84 and 86 can also function as depth indicators, and can protect spool 16 from snow or ice. In some embodiments, front tab 84 can also comprise opening 88 as a means for attaching hook 28 when storing apparatus 10.

Figure 12:
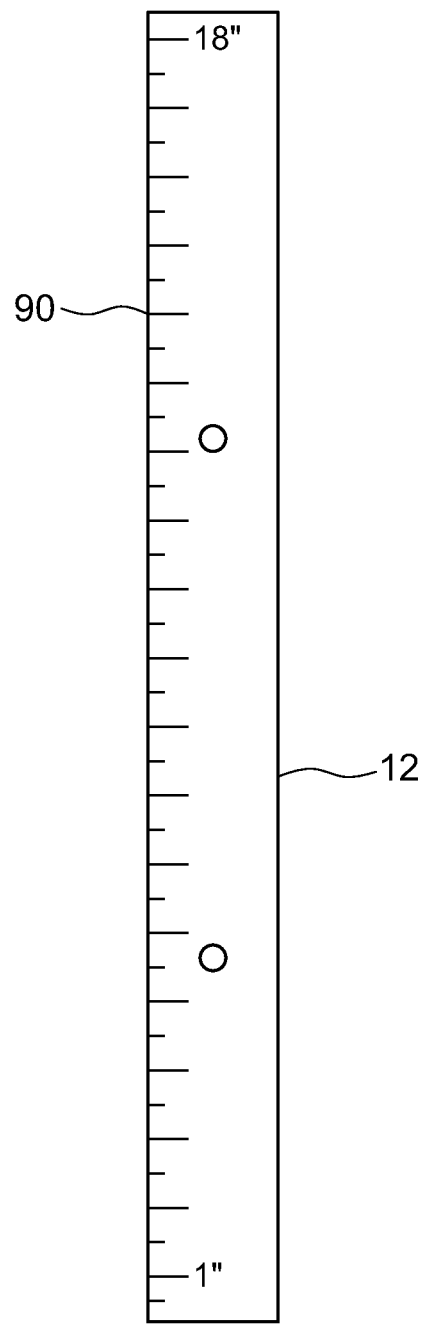
FIG. 12 is a side elevation view depicting a ruler disposed on a rear side of the tower of the fishing apparatus of FIG. 1 or FIG. 2.

In some embodiments, tower 12 can have tape measure or ruler 90 disposed on a vertical side thereof, as shown in FIG. 12. In some embodiments, ruler 90 can be disposed on the side of tower 12 opposite to the side having spool 16 and crane 14 disposed thereon. Ruler 90 can be marked in imperial (i.e, inches) or metric (i.e., centimeters) measurement graduations, or both. Ruler 90 can be used to measure the length of fish caught.

Figure 13:
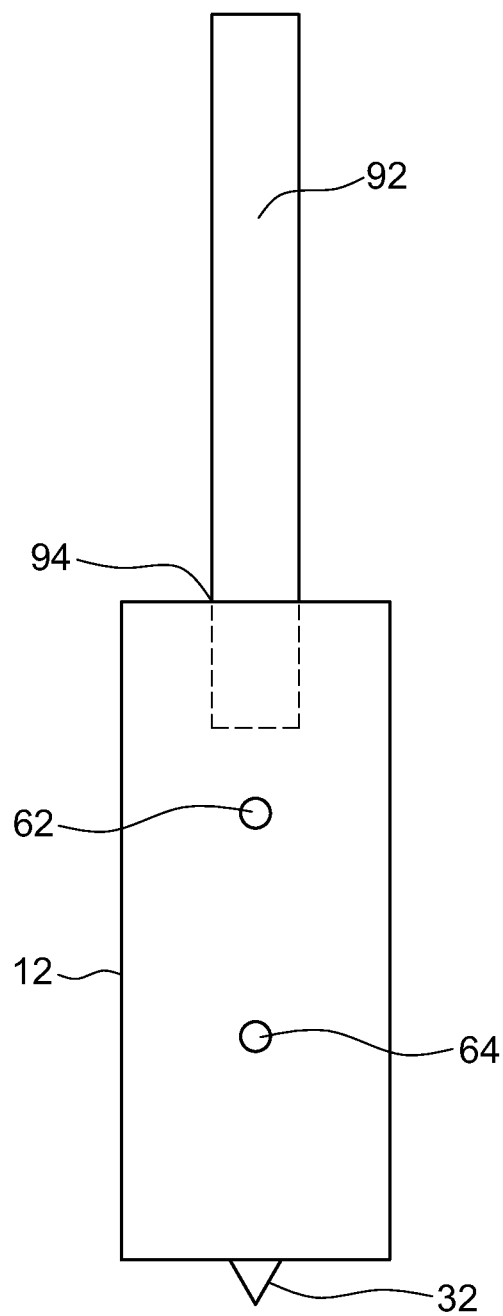
FIG. 13 is a side elevation view depicting the tower of the fishing apparatus of FIG. 1 or FIG. 2 with the reel spool and crane removed, the apparatus having a tower extension disposed thereon.
Figure 14:
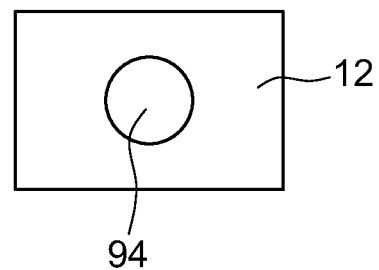
FIG. 14 is a top plan view depicting the tower of FIG. 13 with the tower extension removed.

In some embodiments, tower 12 of apparatus 10 can comprise tower extension 92 that can be configured to releasably attach to the upper end of tower 12. In some embodiments, tower extension 92 can be inserted in hole 94 disposed on the top end of tower 12, as shown in FIGS. 13 and 14. Hole 94 can be sized and shaped to receive tower extension 92 in a snug fit wherein tower extension 92 can be inserted and retained in hole 94, and yet can be removed from hole 94 with a minimum amount of force. In other embodiments, tower extension 92 and hole 94 can be threaded in a complementary manner such that tower extension 92 can be threaded into hole 94, and can be also be removed therefrom. In function, tower extension 92 can increase the height of apparatus 10 wherein should apparatus 10 tip over beside fishing hole 11, as shown in FIG. 1, tower extension 92 can prevent apparatus 10 from falling into fishing hole 11 due to the extended length of apparatus 10. In other embodiments, tower extension 92 can further comprise fluorescent markings to provide additional means for visually locating apparatus 10 when it is snowing or when there are blowing snow conditions that could cover apparatus 10 with snow, and otherwise make locating apparatus 10 difficult in such weather conditions.

Although a few embodiments have been shown and described, it will be appreciated by those skilled in the art that various changes and modifications might be made without departing from the scope of the invention. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

We claim:

1. A fishing apparatus, the apparatus consisting of:
 a) a substantially vertical tower member having upper and lower ends;
 b) a fishing line spool rotatably attached to a first side of the tower member nearer the lower end, the spool configured to rotate about a substantially horizontal first axis;
 c) a crane member comprising a first end and a second end, the crane member rotatably attached to the first side of the tower member nearer the upper end and nearer the first end, the crane member configured to rotate about a substantially horizontal second axis, the crane member further configured to rotate downwards and to contact the spool and brake its rotation;
 d) a fishing line guide disposed on the second end of the crane member; and
 e) means for controlling the rotation of the crane member on the tower member, said means further comprising a first threaded stud passing through a first hole disposed through the crane member and operatively coupled to the tower member, and a first threaded fastener threaded onto the first threaded stud whereupon tightening the first threaded fastener urges the crane member towards the tower member thereby increasing a first force required to rotate the crane member with respect to the tower member.

2. A method for ice fishing, the method comprising the steps of:
 a) drilling a hole for ice fishing through a layer of ice covering a body of water containing fish;
 b) providing a fishing apparatus, the apparatus consisting of:
  i) a substantially vertical tower member having upper and lower ends,
  ii) a fishing line spool rotatably attached to a first side of the tower member nearer the lower end, the spool configured to rotate about a substantially horizontal first axis, the spool further comprising fishing line disposed thereon, the fishing line comprising a hook disposed on a free end thereof, iii) a crane member comprising a first end and a second end, the crane member rotatably attached to the first side of the tower member nearer the upper end and nearer the first end, the crane member configured to rotate about a substantially horizontal second axis, the crane member further configured to rotate downwards and to contact the spool and brake its rotation, iv) a fishing line guide disposed on the second end of the crane member, and v) means for controlling the rotation of the crane member on the tower member, said means further comprising a first threaded stud passing through a first hole disposed through the crane member and operatively coupled to the tower member, and a first threaded fastener threaded onto the first threaded stud whereupon tightening the first threaded fastener urges the crane member towards the tower member thereby increasing a first force required to rotate the crane member with respect to the tower member;

c) erecting the fishing apparatus beside the fishing hole; and d) paying out the fishing line and hook from the fishing apparatus through the fishing hole into the body of water.

3. A fishing apparatus, the apparatus consisting of:

a) a substantially vertical tower member having upper and lower ends;

b) a fishing line spool rotatably attached to a first side of the tower member nearer the lower end, the spool configured to rotate about a substantially horizontal first axis;

c) a crane member comprising a first end and a second end, the crane member rotatably attached to the first side of the tower member nearer the upper end and nearer the first end, the crane member configured to rotate about a substantially horizontal second axis, the crane member further configured to rotate downwards and to contact the spool and brake its rotation;

d) a fishing line guide disposed on the second end of the crane member;

e) means for controlling the rotation of the crane member on the tower member, said means further comprising a first threaded stud passing through a first hole disposed through the crane member and operatively coupled to the tower member, and a first threaded fastener threaded onto the first threaded stud whereupon tightening the first threaded fastener urges the crane member towards the tower member thereby increasing a first force required to rotate the crane member with respect to the tower member; and f) means for controlling the rotation of the spool on the tower member, wherein the means for controlling the rotation of the spool further comprises a second threaded stud passing through a second hole disposed through the spool and operatively coupled to the tower member, and a second threaded fastener threaded onto the second threaded stud whereupon tightening the second threaded fastener urges the spool member towards the tower member thereby increasing a second force required to rotate the spool with respect to the tower member.

\* \* \* \* \*